United States Patent
Muffat et al.

(10) Patent No.: US 11,461,371 B2
(45) Date of Patent: Oct. 4, 2022

(54) METHODS AND TEXT SUMMARIZATION SYSTEMS FOR DATA LOSS PREVENTION AND AUTOLABELLING

(71) Applicant: Dathena Science Pte Ltd, Singapore (SG)

(72) Inventors: Christopher Muffat, Singapore (SG); Tetiana Kodliuk, Singapore (SG)

(73) Assignee: DATHENA SCIENCE PTE LTD., Singapore (SG)

( * ) Notice: Subject to any disclaimer, the term of this patent is extended or adjusted under 35 U.S.C. 154(b) by 188 days.

(21) Appl. No.: 16/731,356

(22) Filed: Dec. 31, 2019

(65) Prior Publication Data
US 2020/0226154 A1    Jul. 16, 2020

(30) Foreign Application Priority Data
Dec. 31, 2018  (SG) .............................. 10201811838T (51) Int. Cl.
| | | |
|---|---|---|
| G06F 7/00 | (2006.01) | |
| G06F 16/28 | (2019.01) | |
| G06F 16/93 | (2019.01) | |
| G06N 5/04 | (2006.01) | |
| G06F 16/242 | (2019.01) | |
| G06N 20/00 | (2019.01) | |

(52) U.S. Cl.
CPC ........ *G06F 16/285* (2019.01); *G06F 16/2433* (2019.01); *G06F 16/93* (2019.01); *G06N 5/04* (2013.01); *G06N 20/00* (2019.01)

(58) Field of Classification Search
CPC .... G06F 16/285; G06F 16/93; G06F 16/2433; G06N 20/00; G06N 5/04
USPC .................................................. 707/600–899
See application file for complete search history.

(56) References Cited

U.S. PATENT DOCUMENTS

2015/0302476 A1*  10/2015  Huang ............... G06Q 30/0256
                                                    705/14.54

\* cited by examiner

*Primary Examiner* — Isaac M Woo
(74) *Attorney, Agent, or Firm* — Allen, Dyer, Doppelt + Gilchrist, PA (57) ABSTRACT

Methods and systems for data loss prevention and autolabelling of business categories and confidentiality based on text summarization are provided. The method for data loss prevention includes entering a combination of keywords and/or keyphrases and offline unsupervised mapping of a path of transfer of specific groups of documents. The offline unsupervised mapping includes keyword/keyphrase extraction from the specific groups of documents and normalization of candidates. The method further includes vectorization of the extracted keywords/keyphrases from the specific groups of documents and quantitative performance measurement of the keyword/keyphrase extraction to derive keywords and/or keyphrases suitable for data loss prevention.

15 Claims, 7 Drawing Sheets

METHODS AND TEXT SUMMARIZATION SYSTEMS FOR DATA LOSS PREVENTION AND AUTOLABELLING

PRIORITY CLAIM

This application claims priority from Singapore Patent Application No. 10201811838T filed on Dec. 31, 2018, which is incorporated herein in its entirety by reference.

TECHNICAL FIELD

The present invention relates generally to document management, and more particularly relates to text summarization techniques and file management platform systems for keyword/keyphrase combination creation for a group of documents or records for data prevention purposes.

BACKGROUND

Information is one of the most important assets in any industry. With more and more cyber-attacks and data breach stories appearing in the media, organizations have become aware of the importance of data management. In addition, the exponential growth of unstructured data in companies makes it very difficult to prevent leakages outside of the corporate network. Data leaks could have grave consequences for a company in terms of exposure of privacy, leakage of business information, and imposition of fines.

Some Data Loss Prevention (DLP) solutions exist on the market to monitor and control endpoint activities (such as Azure Information Protection, MacAfee DLP Endpoint or Symantec Data Loss Prevention) and are known or assumed to be used by many companies. These solutions flag and protect documents which contain some frequent words among a set of keywords.

However, as the vocabularies for these DLP tools are built manually by a human without any fine tuning following an initial period, a very high level of false positive, false negative or simply irrelevant results are likely to occur. In addition, the detection keywords used in DLP policies appear in non-sensitive or allowed publications. For example, using keywords in a sensitive spreadsheet containing figures relating to company performance and sales data will likely feature in the company's published, and therefore public, annual reports.

Thus, there is a need for methods and systems for data loss prevention that are able to address the above-mentioned shortcomings and provide further advantages in terms of prevention and protection. Furthermore, other desirable features and characteristics will become apparent from the subsequent detailed description and the appended claims, taken in conjunction with the accompanying drawings and this background of the disclosure.

SUMMARY

According to at least one embodiment of the present invention, a method for data loss prevention is provided. The method includes entering a combination of keywords and/or keyphrases and offline unsupervised mapping of a path of transfer of specific groups of documents. The offline unsupervised mapping includes keyword/keyphrase extraction from the specific groups of documents and normalization of candidates. The method further includes vectorization of the extracted keywords/keyphrases from the specific groups of documents and quantitative performance measurement of the keyword/keyphrase extraction to derive keywords and/or keyphrases suitable for data loss prevention.

According to another embodiment of the present invention, a system for autolabelling of documents is provided. The system includes a model, a feature extraction module and an autolabelling engine. The module includes a combination of keywords and/or keyphrases. The feature extraction module performs keyword/keyphrase extraction from the documents. And the autolabelling engine autolabels categories and confidential statuses of the documents in response to the keyword/keyphrase extraction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiments to present systems and methods for text summarization for data loss prevention purposes. The method includes scanning the documents or records in one or many data repositories of a computer network or cloud repository, extracting content features and context features, clustering the document vectors and extracting keywords and keyphrases from the cluster of the documents or records.

The focus is put on keyword/keyphrase extraction techniques, which are unique for the text summarization issue for a group of documents or records. A validation engine is also provided in order to find the most optimal combinations of the keywords for data loss prevention systems which is designed to match the group of the documents or records.

According to an aspect of present embodiments, an autolabelling system is provided to predict a business category of the documents or records based on extracted keyphrases in an unsupervised way. According to another aspect of the present embodiments, the autolabelling system is developed to predict the confidentiality of the documents or records based on the extracted keyphrases in an unsupervised way.

According to a further aspect of the present embodiments, a text summarization engine for keyword and keyphrase extraction is developed.

In accordance with the present embodiments, a new domain-independent method and system is provided for extracting discriminative keywords for a group of classified or clustered text documents or records by normalizing keyword weights with the features of the documents or records. Semantic relationships among the words/phrases are learned and considered as keywords/keyphrases so that they can accurately represent the meaning of the group of documents or records and differentiate it from all the others.

For the keywords extraction solution, we introduce a new TDF-IDF approach which normalizes keyword weights with document or record lengths, the frequency of a term across the documents or records, and a maximum frequency of the term in the group of documents or records. For keyphrase extraction, a document rapid automatic keyword extraction (DRAKE) approach is provided which takes advantage of unsupervised keyphrase extraction techniques in rapid automatic keyword extraction (RAKE) and normalizes the candidates in a similar way to a first solution. An advanced method EmbedDocRank is also provided to use word embedding advantages for keyphrase extraction. In addition, a set of quantitative performance measures for keyword/keyphrases extraction evaluation is developed based on information gain and cross-validation. In this way, one can distinguish between the groups of the documents or records by representing them as a cloud of the most accurate combination of keywords/keyphrases and facilitate design of a process for document collection querying. The invited techniques could be used for data classification purposes by aggregating the keywords/keyphrases into a topic which represents business category name.

Figure 1:
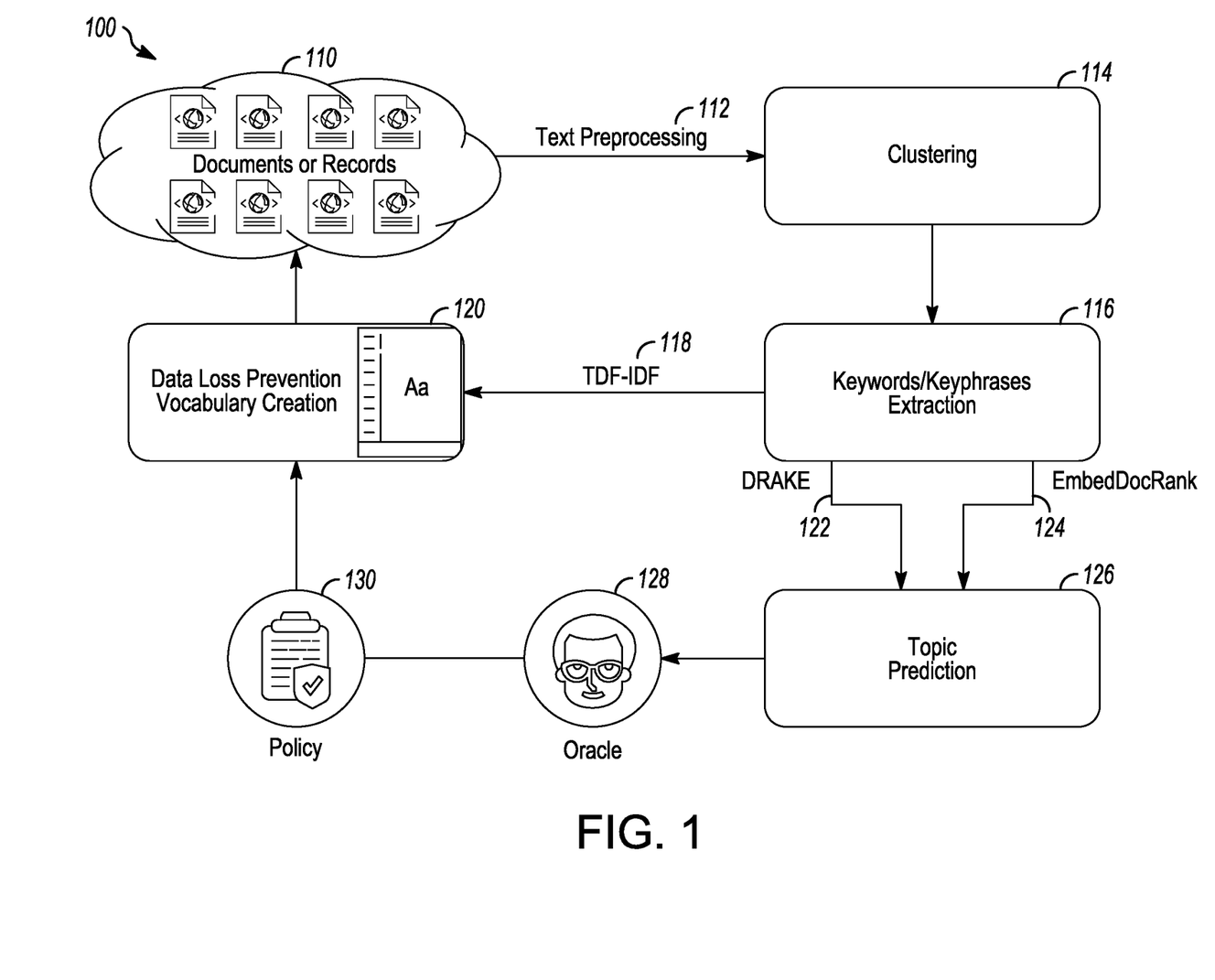
FIG. 1 depicts an illustration of a data loss prevention system in accordance with present embodiments.

Referring to FIG. 1, an illustration 100 of a data loss prevention system in accordance with the present embodiments is depicted. Documents or records 110 are processed by text pre-processing 112 and then clustering 114 is performed on the preprocessed text. The keywords and keyphrases are extracted 116.

Term document frequency—inverse document frequency (TDF-IDF) is defined as an optimized TF-IDF (Term frequency-Inverse Document frequency) method which normalizes term weights with the percentage of the documents or records in a cluster where a word appears. In this case, the words, which are important for a current cluster of the documents or records and are not important for other clusters, have the highest weight. TDF-IDF 118 normalizes term weights with the percentage of the documents or records in a cluster where a word appears for inclusion in a data loss prevention vocabulary 120.

The DRAKE (Document Rapid Automatic Keywords Extraction) approach takes advantage of RAKE (Rapid Automatic Keywords Extraction) and allows extraction of keyphrases for a group of the documents or records. A normalization process is done by taking into account a percentage of the documents or records in the cluster containing a same or similar phrase or word.

EmbedDocRank uses a word embedding methodology by projecting each text object (phrase, document, cluster) into a same N-dimensional space for the cluster keyphrase extraction After the keyword/keyphrase extraction 116, the keywords and key phrases are processed by DRAKE 122 and EmbedDocRank 124 topic prediction 126. An oracle 128 reviews the predicted topics 126 and, in accordance with established policies 130, incorporates selected keywords and keypharses in the data loss prevention vocabulary 120.

Sent2Vec is also used for several steps in the process. First, it is used to compute document embedding. This includes a noise reduction procedure where adjectives and nouns contained in the input document are kept. Next Sent2Vec is used to compute cluster embedding using the same denoising process algorithm. Third, it is used to compute the embedding of each candidate phrase separately based on a part of speech regex and, again, using the same denoising algorithm. Next, the closest (cosine similarity) candidate phrase vectors to the document embedding are selected as document keyphrases and the closest document keyphrases embeddings to the cluster which includes the documents, and the furthest from all the other clusters, are selected as cluster keyphrases.

In developing the aforesaid process, three main techniques have been developed: keyword extraction by TDF-IDF, keyphrase extraction by DRAKE, and keyphrase extraction by EmbedDocRank. Each of the algorithms is sent through an evaluation engine to score extracted information and find combinations of the keywords suitable for data loss prevention systems. Unsupervised classification techniques allow fast business category and confidentiality prediction, that could be done in any offline applications Data loss prevention systems use a combination of keywords to match a group of document, which could lead to loss for any reason. A lot of keyword extraction approaches are widely used to provide a compact representation of document content. However, not all existing keyword/keyphrase extraction techniques could be applied to a group of documents or records to differentiate it from others. The idea of reducing the important information present in a group of similar documents or records should make clustering/classification solutions more understandable and help with the query optimization.

Building efficient keyword vocabularies in accordance with the present embodiments would enable integration and upgrading of existing data loss prevention tools as well as improve the quality of matching, reduce the cost spent on manual vocabulary creation, and automate and stabilize the data loss prevention process Data loss prevention keywords are based on text summarization methods well known in natural language processing. In accordance with the present embodiments, new text summarization techniques are designed, optimized and adjusting to various business use cases by introducing normalization techniques.

Figure 2:
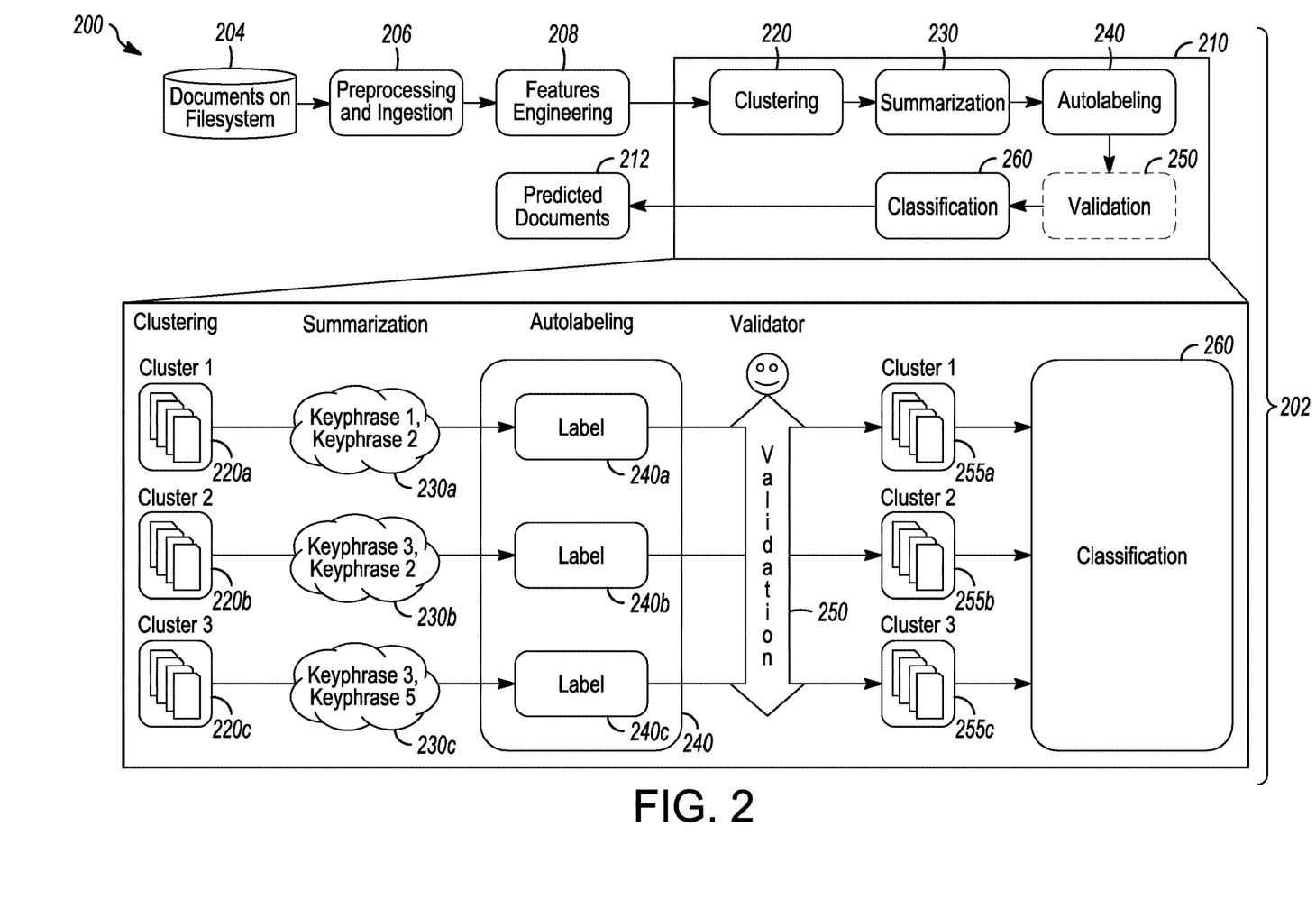
FIG. 2 depicts a block diagram of a classification pipeline in accordance with the present embodiments.

Referring to FIG. 2, a block diagram 200 depicts a classification pipeline 202 in accordance with the present embodiments which introduces a second use case for text summarization. Documents 204 on a file system or other storage (e.g., cloud) is pre-processed and ingested 206 into the system where features engineering 208 is performed before processing 210 to obtain predicted documents 212.

The processing includes clustering 220 which separates the documents into clusters 220a, 220b, 220c. A summarization module 230 performs keyphrase extraction to create keyphrases 230a for the cluster 220a, keyphrases 230b for the cluster 220b, and keyphrases 230c for the cluster 220c. An autolabelling module 240 adds labels 240a, 240b and 240c before optional validation 250 of the clusters 255a, 255b, 255c. The clusters 255a, 255b, 255c are classified by a classification module 261 before passing the classified documents of each cluster 255a, 255b, 255c to the predicted documents 212.

Text summarization has emerged as an important research area in recent years. A lot of keyword extraction approaches are widely used to provide a compact representation of document content. However, not all existing keyword/keyphrase extraction techniques could be applied to a group of documents to differentiate it from the others. The idea of reducing important information present in a group of similar documents makes clustering/classification solutions easy to understand and helps with the query optimization.

For keyword extraction, a new approach, TF-IDF, is introduced which normalizes keyword weights with a length of the documents, the frequency of a term across the documents, and a maximum frequency of the term in a given group of documents. The well-known TF-IDF approach has an issue when applying it to a set of the documents: it is very sensitive to document length and term frequency. For example, when one term appears in all the documents in a cluster a hundred times altogether and another word appears a hundred times in only one document, they will get the same weight in representation of the current cluster. The goal is to find the proper normalization techniques to include document engagement into the weight calculation process.

On the first normalization approach term frequency is multiplied by percentage of the documents containing these terms as shown in Equations (1) and (2).

$$TDF = TF \times Doc\ \%  \quad (1)$$

$$tfidf_{i,j} \times \log\left(\frac{N}{df_i}\right) \quad (2)$$

$tf_{i,j}$ = total number of occurences of $i$ in $j$
$df_i$ = total number of documents (speeches) containing $i$
$N$ = total number of documents (speeches)

The term frequency is calculated in a cluster/class and the term frequency is multiplied into a percentage of the documents where a word appears. Then, the IDF score is calculated for the words per cluster. On a second normalization approach, the already normalized term frequency is multiplied by a percentage of the documents containing these terms as shown in Equations (3) and (4).

$$TNDF = T\_norm \times Doc\ \% \quad (3)$$

$$tfidf_{i,j} \times \log\left(\frac{N}{df_i}\right) \quad (4)$$

$tf_{i,j}$ = total number of occurences of $i$ in $j$
$df_i$ = total number of documents (speeches) containing $i$
$N$ = total number of documents (speeches)

The term frequency is calculated in a cluster/class and the document frequency (i.e., how many documents include the term) is calculated. Then, the IDF score is calculated for the words per cluster.

Rapid automatic keyword extraction (RAKE) is a keyword extraction method that is extremely efficient, operates on individual documents to enable application to dynamic collections, is easily applied to new domains, and operates well on multiple types of documents, particularly those that do not follow specific grammar conventions. The input parameters for RAKE comprise a list of stop words (or stoplist), a set of phrase delimiters, and a set of word delimiters. RAKE uses stop words and phrase delimiters to partition the document text into candidate keywords, which are sequences of content words as they occur in the text. Co-occurrences of words within these candidate keywords are meaningful and allows identification of word co-occurrence without the application of an arbitrarily sized sliding window. Word associations are thus measured in a manner that automatically adapts to the style and content of the text, enabling adaptive and fine-grained measurement of word co-occurrences that will be used to score candidate keywords.

RAKE begins keyword extraction on a document by parsing its text into a set of candidate keywords. First, the document text is split into an array of words by the specified word delimiters. This array is then split into sequences of contiguous words at phrase delimiters and stop word positions. Words within a sequence are assigned the same position in the text and together are considered a candidate keyword. After every candidate keyword is identified, a score is calculated for each candidate keyword and defined as the sum of its member word scores sum (deg(w)/freq(w)). After candidate keywords are scored, the top N scoring candidates are selected as keywords for the document. For RAKE normalization, the keyphrase weight is normalized by percentage of the documents containing the keyphrase, thereby making it easier to extract the keyphrase. Examples of RAKE and DRAKE key phrases are shown in Table 1.

TABLE 1

| DOCUMENTS GROUP 1 | |
|---|---|
| RAKE | DRAKE |
| modern post-industrial societies | social security number |
| hundred fifty dollars | criminal justice system |
| flippin police department | law enforcement agency |
| hybrid offence conviction | medical research council |
| sexual servitude slavery | supreme court held |
| trading floor operations | british crime survey |
| invite people suspected | javelin strategy research |
| disclose relevant information | trade practice act |
| requires ministerial approval | giving false information |
| national fbireport | child support agency |
| drug committee meeting | undercover operative operating |
| sixteenth periodic report | high school diploma |
| rational utilitarian scale | unisys security index |
| general public notification | visa bail advice |
| corporate security consulting | |
| traffic school license | |
| israeli government published | |
| crime involving dishonesty | |
| group health plans | |
| made telephone contact | |
| introducing contraband inside | |
| israeli military forces | |
| corporate crisis management | |
| juvenile corrections officer | |
| single gunshot wound | |

EmbedDocRank is normalized EmbedRank, which is a text summarization approach based on word embeddings. It is more advanced in comparison with previous methods as it takes to account context-based similarity between words and phrases and the whole document/cluster text. In accordance with the present embodiments, the proposed EmbedDocRank method also generates cluster embedding vectors, a feature which was not implemented in the classic EmbedRank.

The EmbedRank method consist of three main steps: extract candidate phrases, use sentence embeddings, and rank the candidate phrases. In the first step, the candidate phrases are extracted from the text, based on part-of-speech sequences. Thereafter, the sentence embeddings are used to embed both candidate phrases and the document itself in the same high-dimensional vector space. Then the candidate phrases are ranked to select the output keyphrases The workflow of candidate phrases extracts segments sentences from a document by delimiters and sentence detector of OpenNLP and then Extracts phrases from sentence by segmenting words from sentence by a white-space, The part-of-speech (POS) taggers are taken from a sequence of words by POS Tagger of OpenNLP, Phrases are extracted from sequence of tokens and pos-taggers by the rule: "Keep only phrases that consist of zero or more adjectives followed by one or multiple nouns". Then normalize and remove stopwords from extracted phrases and filter duplicated or similar phrases.

Figure 3:
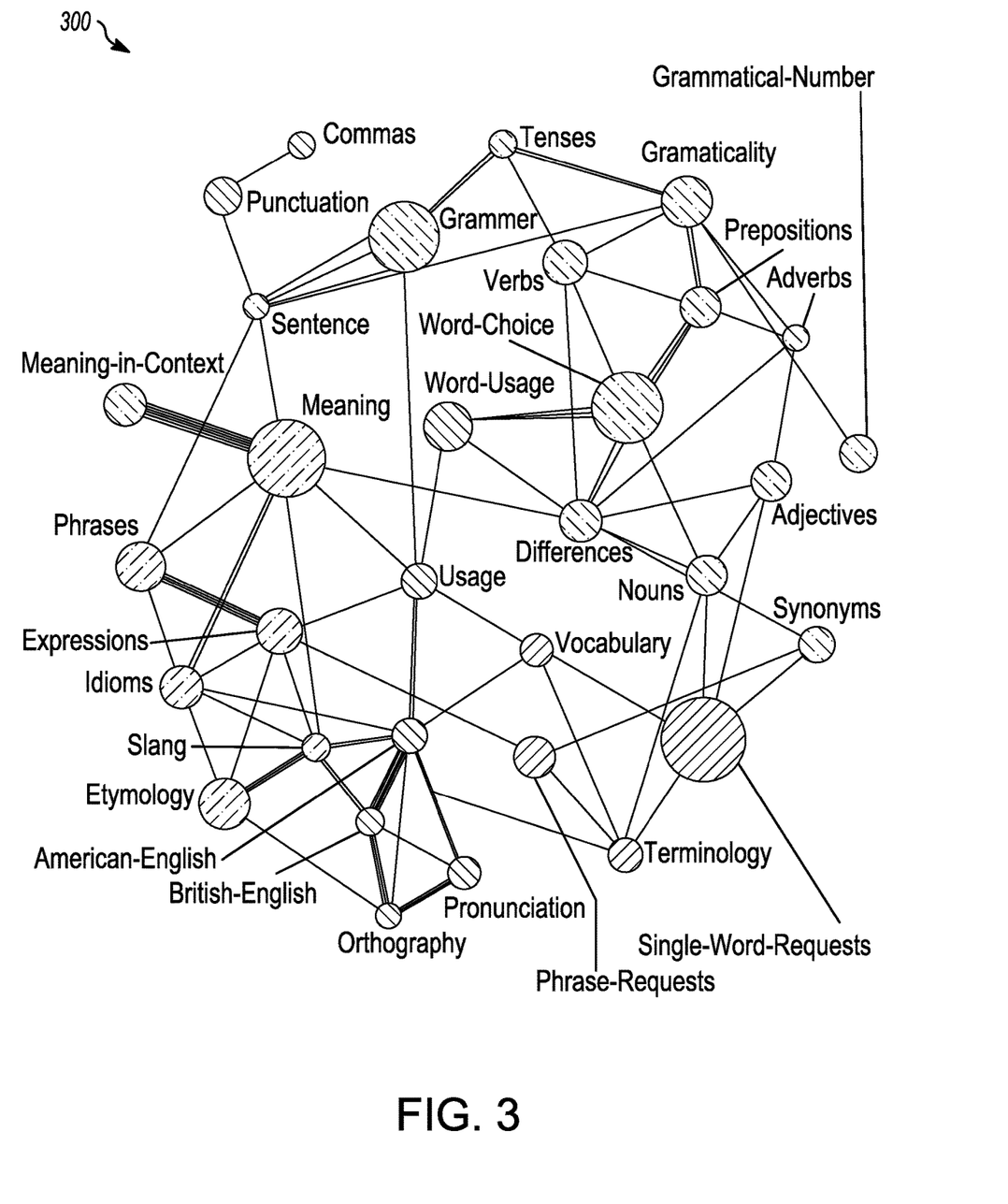
FIG. 3 depicts an illustration of candidate selection in accordance with the present embodiments.

The second step of the keyphrase extraction method in accordance with the present embodiments (i.e., embeddings computation) consists of computing a document embedding which includes a noise reduction procedure, where only the adjectives and nouns contained in the input document are kept. Then, the embedding of each candidate phrase is computed separately with the same algorithm. In both cases of embedding, the public pretrained models of Sent2Vec are used. Referring to FIG. 3 an illustration 300 depicts candidate selection in accordance with the present embodiments.

By returning the N candidate phrases closest to the document embedding, EmbedRank only accounts for the phrase informativeness property, leading to redundant keyphrases. In implementation in accordance with the present embodiments, the top-N candidate phrases are selected by using the Maximal Marginal Relevance (MMR) metric as shown in Equation (5).

$$MMR := \underset{C_i \in C \setminus K}{\operatorname{argmax}}[\lambda \cdot \widetilde{\cos}_{sim}(C_i, doc) - (1-\lambda)\max_{C_j \in K}\widetilde{\cos}_{sim}(C_i, C_j)] \quad (5)$$

where C is the set of candidate keyphrases, K is the set of extracted keyphrases, doc is the full document embedding, $C_i$ and $C_j$ are the embeddings of candidate phrases i and j, respectively, $\lambda$ is the trade-off parameter and $\sim\cos_{sim}$ is a normalized cosine similarity, described by Equations (6) and (7):

$$\widetilde{\cos}_{sim}(C_i, doc) := 0.5 + \frac{ncos_{sim}(C_i, doc) - \overline{ncos_{sim}(C, doc)}}{\sigma(ncos_{sim}(C, doc))} \quad (6)$$

$$ncos_{sim}(C_i, doc) := \frac{\cos_{sim}(C_i, doc) - \min_{C_j \in C}\cos_{sim}(C_j, doc)}{\max_{C_j \in C}\cos_{sim}(C_j, doc)} \quad (7)$$

The proposed EmbedDocRank approach changes the last two steps of the text summarization workflow: the embeddings computation and the candidates selection. We compute cluster embedding vector based on Sent2Vec to use it for the similarity between keyphrases candidates vectors and documents embedding vectors calculation. EmbedDocRank uses Word embeddings methodology by projecting each text object (phrase, document, cluster) into the same N-dimensional space for the cluster keyphrases extraction.

Figure 4:
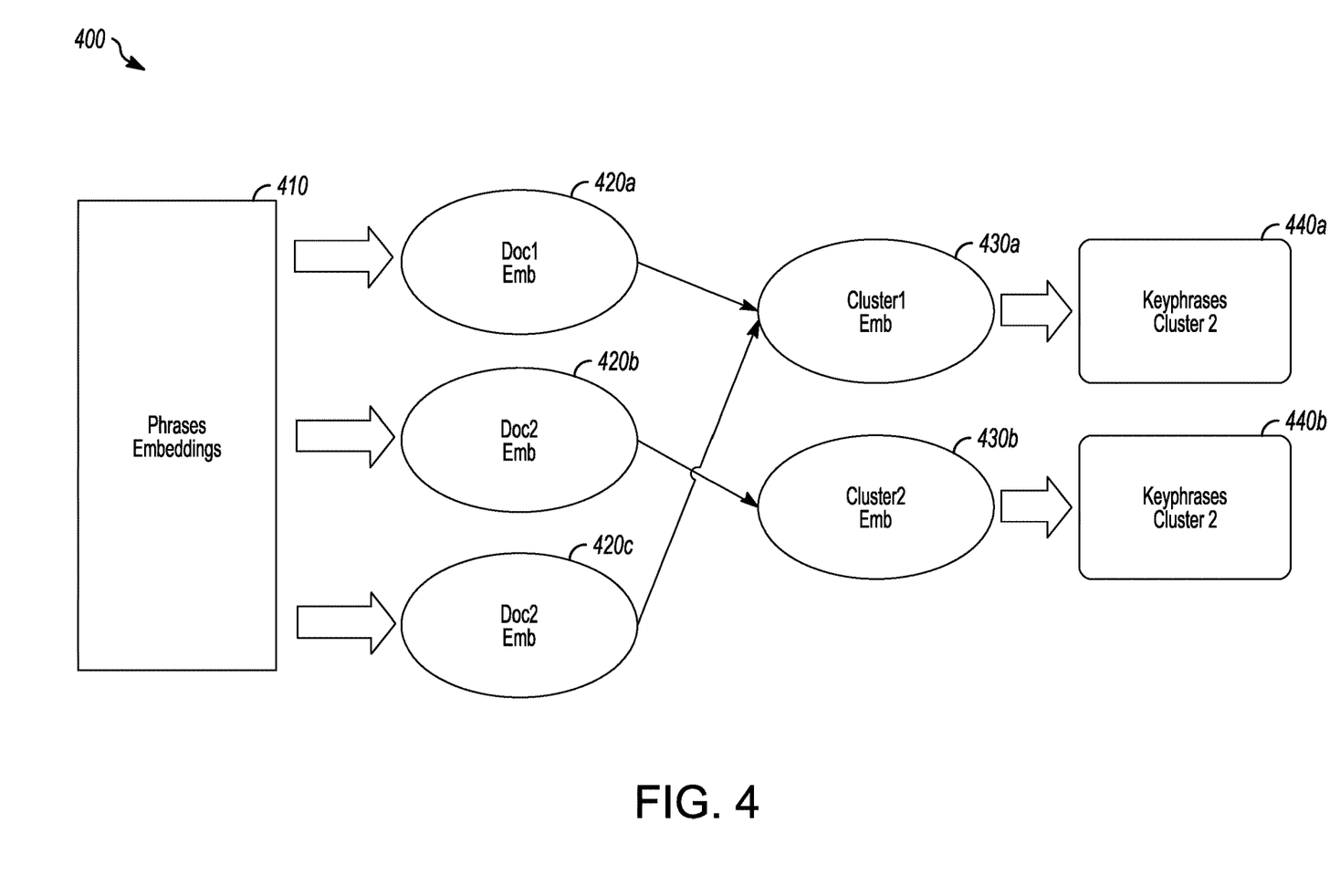
FIG. 4 depicts an illustration of a text summarization workflow in accordance with the present embodiments.

Referring to FIG. 4, an illustration 400 depicts the new text summarization workflow in accordance with the present embodiment. As with the previous workflow, the document embedding is computed including a noise reduction procedure where we keep only the adjectives and nouns contained in the input document and the cluster embedding is computed using the same denoising process.

The next step 410 is computing the embedding of each candidate phrase (based on PoS regex) separately, again with the same algorithm. Then, the closest (cosine similarity) candidate phrase vectors to the document embedding are selected as document keyphrases 420a, 420b, 420c. The closest document keyphrases embeddings 430a, 430b to the cluster which includes the documents and the furthest from all the other clusters are selected as cluster keyphrases 440a, 440b.

Figure 5:
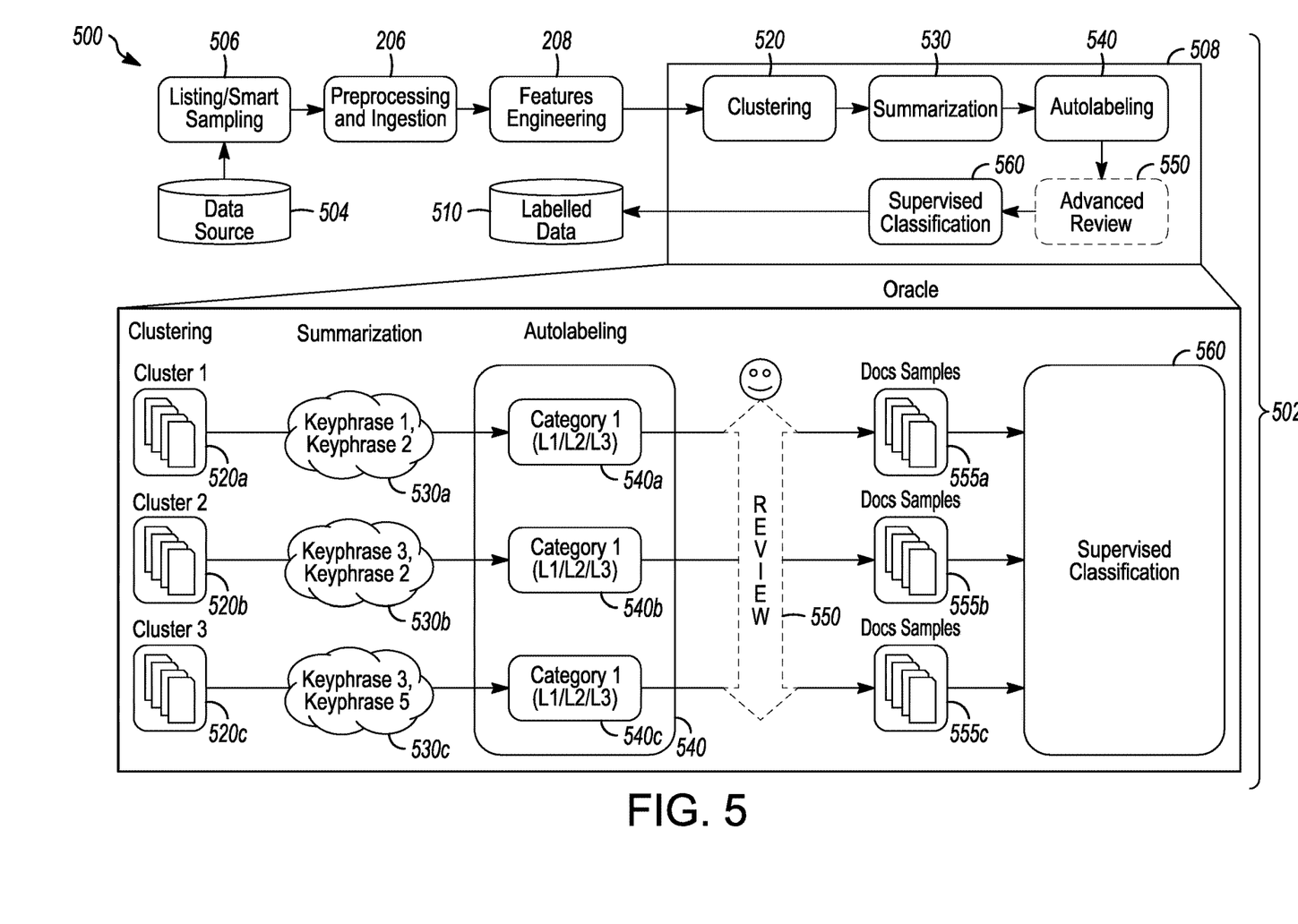
FIG. 5 depicts a block diagram of an autolabelling pipeline in accordance with the present embodiments.

Referring to FIG. 5, a block diagram 500 depicts an autolabelling pipeline 502 in accordance with the present embodiments. Listing and smart sampling 506 of documents in a data source 504 are pre-processed and ingested 206 into the system where features engineering 208 is performed before processing 508 to obtain labelled data 510.

The processing includes clustering 520 which separates the documents into clusters 520a, 520b, 520c. A summarization module 530 performs keyphrase extraction to create keyphrases 530a for the cluster 520a, keyphrases 530b for the cluster 520b, and keyphrases 530c for the cluster 520c. An autolabelling module 540 adds labels 540a, 540b and 540c in accordance with labels 1, 2 and 3 (L1/L2/L3 categories) before optional advanced review 550 of the clusters 555a, 555b, 555c. The clusters 555a, 555b, 555c are classified by a supervised classification module 560 before passing the classified documents of each cluster 555a, 555b, 555c to the labeled data 510.

The autolabelling approach combines keyword/keyphrase extraction techniques (described above) and the use of pretrained models containing word representations. Keyphrases are extracted from a group of documents and are defined as candidates for label (business categories), and the autolabeling will refine its choice by also using similar words that are taken from the models containing word embeddings. All these potential candidates are then smartly compared to the possible business categories, and a final choice of category is then made for each cluster.

Figure 6:
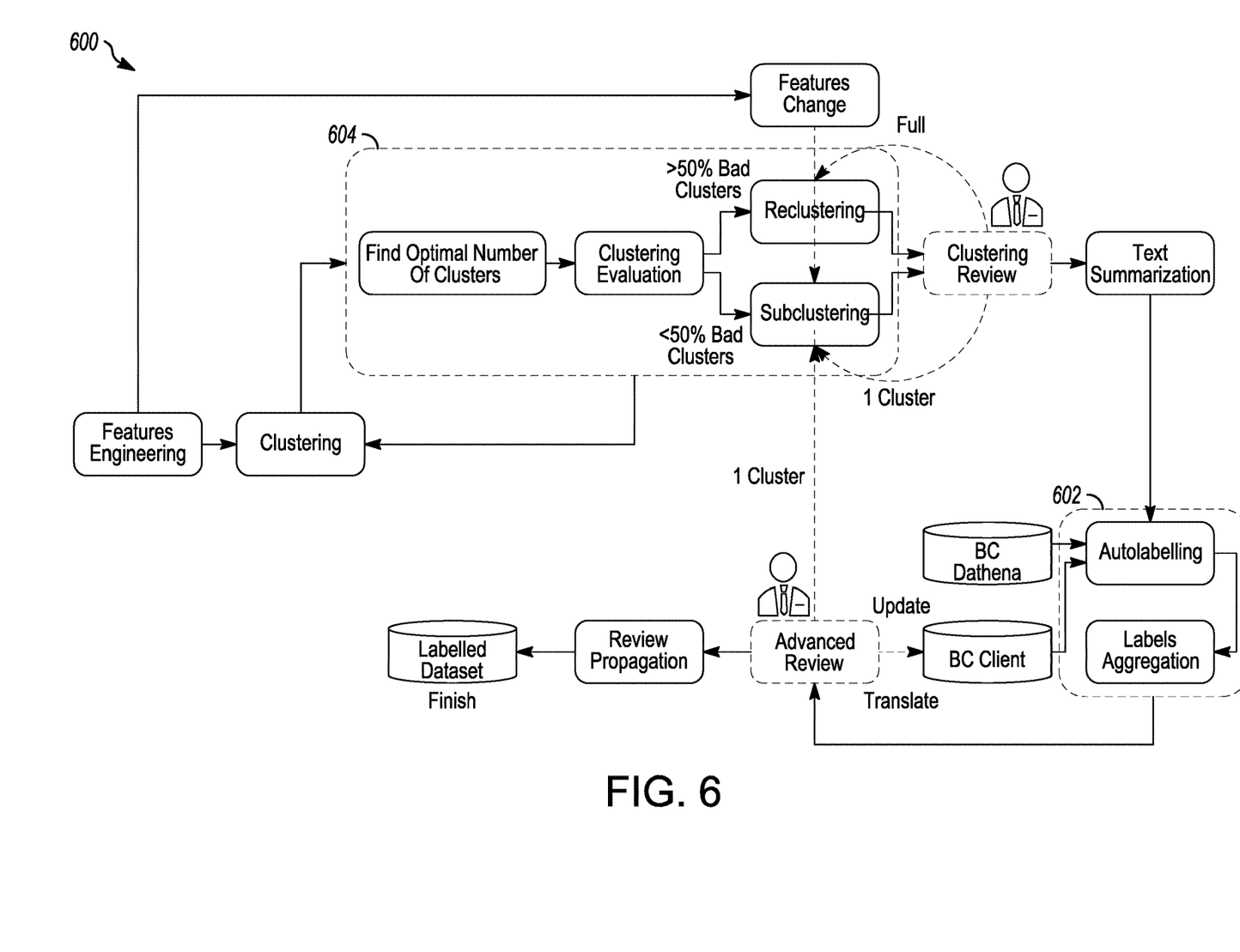
FIG. 6 depicts a flow diagram of an autolabelling process in accordance with the present embodiments.

Referring to FIG. 6, a block diagram 600 also depicts an autolabelling process in accordance with the present embodiments. First, autolabelling can be divided into two important modules: the actual process of labelling clusters 602 and the process of review 604. The process of labelling takes as input keyphrases for different mode, as well as type of category to process and then computes six important information for each combination of modes and type: (a) L1—autogenerated and (b) L2—autogenerated which are completely created labels that are not limited by knowledge of previous categories; (c) L1—Similarity and (d) L2—Similarity which are selected among the pre-defined categories inside the database; (e) L2—Confidence which is a level of confidence of the previously assigned L2 category (i.e., a probability of being correct); and (f) L3—Similarity wherein one of the keyphrases is selected as an L3.

At the end of the process of labelling, a report is created in a excel file. This helps the review step 604. The review process 604 is simple. Starting from the csv file containing information about clusters and the labels assigned to the cluster by the labelling module, the CSE fills each row with three new columns (four if we include Confidentiality-Reviewed) called L1—Reviewed, L2—Reviewed and L3—Reviewed. Then the review process can be launch and it will assign in a new column of the database, the correct category reviewed. If it does not exist, the category is created (and always assigned as a client category).

So, for each sentence the embedding is created as an average of word embeddings weighted by its given probability p(w) and a regularization factor a. The factor is fixed, and the probability of the word is computed from the frequency of the word found in training of the model. So, instead of project sentence and categories in the FastText vector space, we regularize embedding for each sentence and categories and finally use cosine similarity to compare them.

In terms of L3 aggregation, for each cluster, we looked at the L3 level which is one of the keyphrases and compared it to all other L3 of other clusters. We grouped clusters together that had similarity above a threshold t. Then, for each cluster in a group we compute the similarity of the cluster L3 with all the other cluster unsupervised L2 and its own unsupervised L2 and summed all of them. Then, we saved the score for this cluster. The thought here is that a category is needed to measure "how close" a L3 is from each cluster. The unsupervised L2 is selected as base as it is the most generalization and aggregation of keyphrases for a given cluster.

In the end, we selected the L3 with the highest score and assigned it to all clusters in the group wherein this L3 replaces previous L3's of the cluster in the group For performance review of the model, two things were evaluated: The MSE and the Spearman correlation. The MSE with a similarity dataset used cross-lingual and translation. The Spearman correlation measurement helped quantify how much the model has a linear relationship with a human review (the closer to 1, the better). The problem encountered was that one model is better on MSE with a cosine distance while another model has a higher Spearman correlation. This might be due to the dimensionality increase that affects the cosine distance. The modeled datasets are also not great (the data sets were only 300 point and translated).

Figure 7:
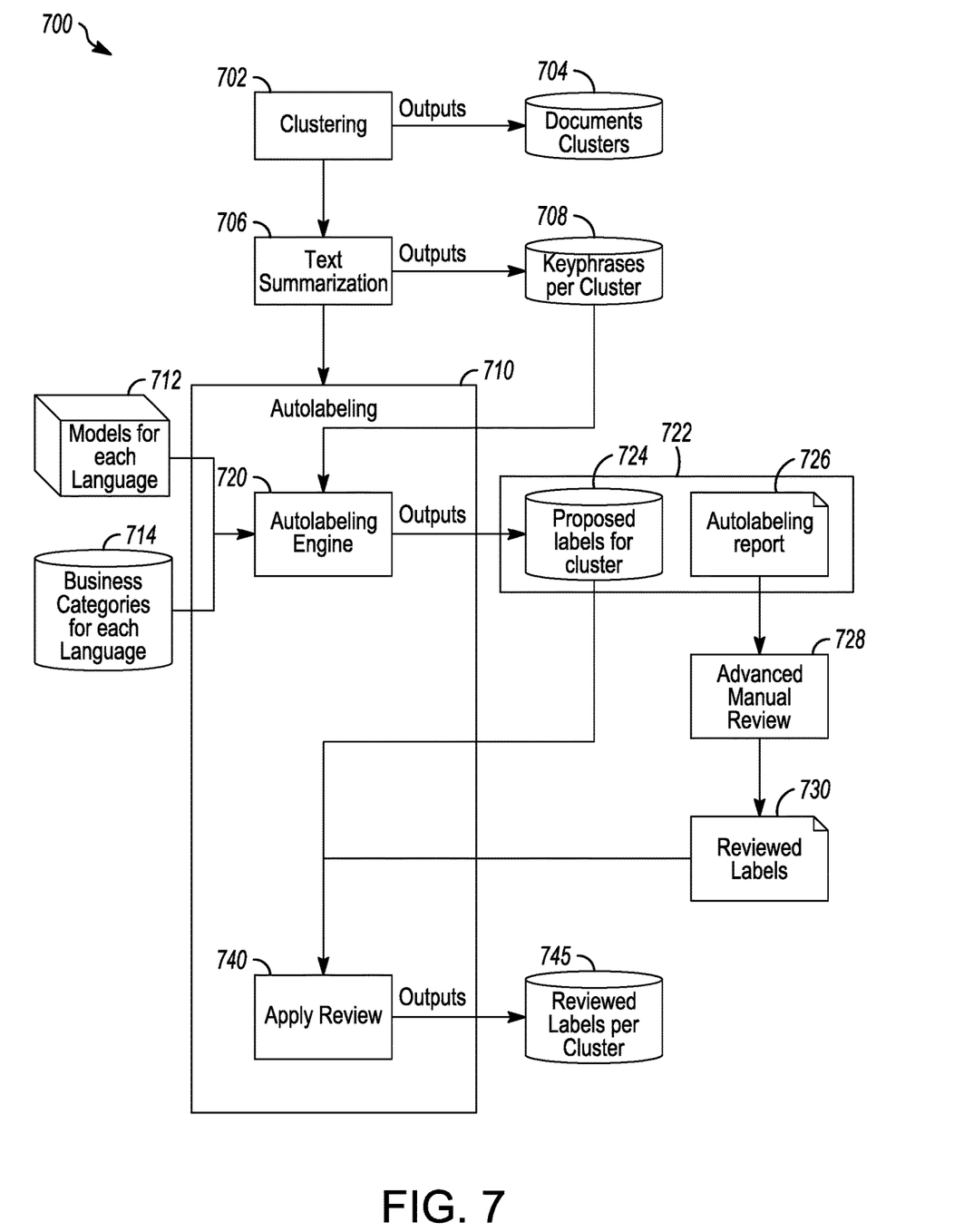
FIG. 7 depicts a block diagram of an autolabelling process in accordance with the present embodiments.

Referring to FIG. 7, a block diagram 700 of an autolabelling process in accordance with the present embodiments is depicted. Clustering 702 of documents outputs document clusters 704 and also provides the clusters to text summarization 706. The text summarization 706 outputs keyphrases per cluster 708 and provides output to an autolabelling module 710. Models for each language 712 and business categories for each language are also provided to the autolabelling module 710.

The autolabelling module 710 includes an autolabelling engine 720 and an apply review 740. The autolabelling engine receives the models and business categories for each language from the modules 712, 714 and the keyphrases per cluster 708. The autolabelling engine 720 outputs labelled data to a module 722 which stores proposed labels per cluster 724 and generates an autolabelling report 726. The autolabelling report 726 receives an advanced manual review 728 which may generate reviewed labels 730.

The proposed labels per cluster 724 and the reviewed labels are provided the apply review 740 which outputs reviewed labels per cluster 745. In this manner, the reviewed labels per cluster have been auto generated by the autolabelling engine 720 and reviewed (validated) by the apply review 740.

Thus, it can be seen that the present embodiments provide systems and methods for both data loss prevention and autolabelling for business category and confidentiality prediction based on text summarization which provide improved performance over previous system. For the data loss prevention systems and methods, the focus is on keyword/keyphrase extraction techniques which are unique for text summarization issues for a group of documents or records. A validation engine is developed to find the most optimal combinations of the keywords for data loss prevention. For the autolabelling system and methods, the business category of the documents or records are advantageously predicted based on extracted keyphrases in an unsupervised way.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

That which is claimed is:

1. A method for data loss prevention comprising:
   entering a combination of keywords and/or keyphrases;
   offline unsupervised mapping of a path of transfer of specific groups of documents, wherein the offline unsupervised mapping comprises:
   keyword/keyphrase extraction from the specific groups of documents; and
   normalization of candidates;
   vectorization of the extracted keywords/keyphrases from the specific groups of documents; and
   quantitative performance measurement of the keyword/keyphrase extraction to derive keywords and/or keyphrases suitable for data loss prevention, wherein the extracted keywords/keyphrases correspond to the specific groups of documents.

2. The method in accordance with claim 1 wherein the offline unsupervised mapping further comprises text summarization from the specific group of documents.

3. The method in accordance with claim 1 further comprising autolabelling categories and confidential statuses of documents of the specific groups of documents in response to the keyword/keyphrase extraction.

4. The method in accordance with claim 1 wherein the combination of keywords and/or key phrases comprises both positive and negative combinations.

5. The method in accordance with claim 1 wherein the keyword/keyphrase extraction comprises keyword extraction by TDF-IDF.

6. The method in accordance with claim 1 wherein the keyword/keyphrase extraction comprises keyphrase extraction by DRAKE.

7. The method in accordance with claim 1 wherein the keyword/keyphrase extraction comprises keyphrase extraction by EmbedDocRank.

8. The method in accordance with claim 1 wherein the vectorization of the extracted keywords/keyphrases from the specific groups of documents comprises valuation based on information gain and cross-validation.

9. A system for autolabelling of documents comprising:
   a model comprising a combination of keywords and/or keyphrases;
   a feature extraction module for keyword/keyphrase extraction from the documents; and
   an autolabelling engine for autolabelling categories and confidential statuses of the documents in response to the keyword/keyphrase extraction, wherein the extracted keywords/keyphrases correspond to the documents.

10. The system in accordance with claim 9 further comprising a data loss prevention module for performing a quantitative performance measurement of the keyword/keyphrase extraction to derive keywords and/or keyphrases suitable for data loss prevention.

11. The system in accordance with claim 9 further comprising a text summarization module for text summarization of the keywords/keyphrases extracted from the documents.

12. The system in accordance with claim 9 wherein the combination of keywords and/or key phrases comprises both positive and negative combinations.

13. The system in accordance with claim 9 wherein the feature extraction module performs keyword extraction by TDF-IDF.

14. The system in accordance with claim 9 wherein the feature extraction module performs keyphrase extraction by DRAKE.

15. The system in accordance with claim 9 wherein the feature extraction module performs keyphrase extraction by EmbedDocRank.

* * * * *